United States Patent [19]

Casey

[11] Patent Number: 4,598,309

[45] Date of Patent: Jul. 1, 1986

[54] TELEVISION RECEIVER THAT INCLUDES A FRAME STORE USING NON-INTERLACED SCANNING FORMAT WITH MOTION COMPENSATION

[75] Inventor: Robert F. Casey, Middlesex County, N.J.

[73] Assignee: RCA Corporation, Princeton, N.J.

[21] Appl. No.: 614,668

[22] Filed: May 29, 1984

[51] Int. Cl.[4] ............................................. H04N 7/01
[52] U.S. Cl. ......................................... 358/11; 358/31
[58] Field of Search ............................. 358/11, 12, 31

[56] References Cited

U.S. PATENT DOCUMENTS 4,400,719  8/1983  Powers ................................... 358/11
4,530,004  7/1985  Achiha et al. ......................... 358/11

FOREIGN PATENT DOCUMENTS 2915359   10/1980  Fed. Rep. of Germany .
59-40772   3/1984  Japan .
209050A    7/1982  United Kingdom .
2111343    6/1983  United Kingdom .
2111343A   6/1983  United Kingdom .

OTHER PUBLICATIONS

A paper entitled, "Signal Processing for Wide Screen Television: The Smart Receiver", by J. Nadan et al., Presented at the SMPTE Television Conference in Montreal, Canada on Feb. 10–11, 1984.
Article by D. H. Pritchard entitled, "CCD Comb Filter for Color TV Receiver Picture Enhancement", published in RCA Review, vol. 14, Mar. 1980.
U.S. patent application Ser. No. 614,310, filed May 25, 1984 in the name of W. H. Nicholson.

Primary Examiner—John W. Shepperd
Attorney, Agent, or Firm—P. J. Rasmussen; P. M. Emanuel; R. G. Coalter

[57] ABSTRACT

A television apparatus for displaying the picture information of an interlaced signal, such as a baseband NTSC signal, in a non-interlaced scanning format is described. When no picture change occurs, the picture information of the first and the second fields of the NTSC signal are displayed in alternate scan lines of the display of the apparatus, respectively, to form a picture frame during one vertical scanning interval. A signal, indicative that a picture change occurs in a section of the picture frame, is generated when a picture change occurs. The picture change indicative signal is obtained by using a frame comb filter to detect interframe picture variations. The picture change indicative signal causes the displayed picture information in that section of the picture frame to be derived from one field of the NTSC signal.

10 Claims, 5 Drawing Figures

TELEVISION RECEIVER THAT INCLUDES A FRAME STORE USING NON-INTERLACED SCANNING FORMAT WITH MOTION COMPENSATION

This invention relates to television systems and, more particularly, to television display apparatus, for displaying the picture information of a television signal that was produced by an interlaced scanning process, hereinafter referred to as the interlaced signal, in a non-interlaced scanning format.

BACKGROUND OF THE INVENTION

Television signals based on present day standards create visible artifacts on conventional television receivers and monitors. In broadcast systems such as the 525 line-per-frame, 30 frame-per-second 525/30 NTSC system or the 625/25 PAL system, artifacts occur because of the interlaced scanning process. This process divides the 525-line picture or frame of the NTSC standard into two successive 262½-line fields. The 262½ lines of one field are scanned in 1/60th of a second followed by scanning of an additional 262½ lines of another field with lines of the second field occupying the spaces between the lines of the first field. One subjective effect of this interlaced scan is to create in the presence of motion in the picture scene, an apparent vertical drift of the lines of the raster known as "line crawl". The apparent drift is substantially more apparent when viewing a wide-screen display at close range. Another well-known objectionable visible effect is interline flicker on line-to-line transitions that occurs because of the interlaced scanning format.

Recent interest in the development of high definition television systems (HDTV) has been directed towards techniques that are intended to enhance the subjective performance of present systems within the constraints of existing standards. One approach, a technique referred to as progressive scan, or non-interlaced scan, has been described in patent materials and literature. For example, all the scan lines are scanned consecutively from the top of the display screen and downward to the bottom of the display screen during each vertical scanning interval. Progressive scan results in the reduction of interlaced scanning format related artifacts such as interline flicker and line crawl that exist in conventional two-to-one interlaced displays. The subjective effect is a more pleasing picture presentation to the viewer.

The picture details displayed in the non-interlaced format are made to substantially conform to the picture details contained in the interlaced signal, in the case where no motion in the picture scene is detected. Motion related aspects of the invention are described later on. Where no motion occurs, the picture information of one field of the interlaced NTSC signal is displayed in one set of the alternate scan lines, and that of the other field is displayed in a different set of scan lines that interleaves with the scan lines to form a picture frame. In the non-interlaced scanning format, each scan line of the one set is scanned immediately after the scanning of a scan line of the different set, for example, such that the picture progressively fill the screen of the display. All the scan lines of a picture frame are scanned consecutively during one vertical scanning interval.

Differences in scene content due to object movement or television camera panning that occur from one field time to the immediately following one are characterized as being visual motion of the scene content. If such motion is not taken into account in the course of displaying the picture contents of an interlaced signal in a non-interlaced scanning format, edges of moving objects may appear as having discontinuous transitions. This is so because the one set of displayed lines represents picture information that occurred one sixtieth of a second apart from picture information that is represented by the other set of displayed lines. The result is a jagged appearance for horizontal motion, and a smearing effect for vertical motion; such artifacts are objectionable.

One aspect of the invention is that when motion is detected in a section of the picture, then one field of the interlaced signal primarily is made to provide picture information for display in the scan lines of that section of the display where motion occurs. Thus, the picture information of moving edges of an object that is displayed in a non-interlaced format, is derived predominantly from one field of the interlaced signal. For example, assume that the picture information that is displayed in each display line of the one set of display lines is contained in the corresponding active video line of one field of the interlaced signal. In this case, the picture information that is displayed in each of the interleaving lines of the other set of display lines in the section of the display where motion occurs, is obtained by averaging the two signals that provide picture information for display in the immediately preceding and following scan lines, respectively. As a result, the zigzag or jagged types of artifacts of moving objects that occur when a motion compensation scheme is not utilized, are reduced when the the picture information of moving objects is derived from one field of the interlaced signal.

Though some picture details are lost in such sections of the display screen when motion is detected, as a result of the motion compensation scheme of the invention, this loss in the presence of motion is not highly discernible. This is so because of the well-known fact that the ability of the human eye to discern fine picture details of moving objects is not as good as its ability to discern fine picture details of the same objects when they are stationary.

Another aspect of the invention is that motion is detected by comparing two video lines of the interlaced signal that are separated by one frame time. Thus, a difference signal produced by the comparison process is indicative of picture scene changes between a given pixel of one frame and the same pixel of the immediately following frame.

SUMMARY OF THE INVENTION

A television signal is applied to a delay element that delays the television signal by one field period and by one frame period, respectively, to produce field and frame delayed television signals. First and second luminance component signals are produced, respectively, from the frame and field delayed television signals, respectively. The first and second luminance component signals are combined to produce a first luminance output signal. A second luminance output signal is generated from the second luminance signal. The first and second luminance output signals are capable of providing picture information for display in a first plurality and in a different second plurality of display lines, respectively, of a non-interlaced television display, to form a picture frame.

BRIEF DESCRIPTION OF THE DRAWINGS

FIGS. 1a, b, c, and d are useful in explaining the picture information from the television signal of FIG. 2 that is displayed in the corresponding scan lines of the cathode ray tube of FIG. 4;

FIGS. 5a–l illustrate schematically timing diagrams useful in explaining the operation of the television apparatus of FIG. 4.

DETAILED DESCRIPTION OF THE INVENTION

Figure 1:
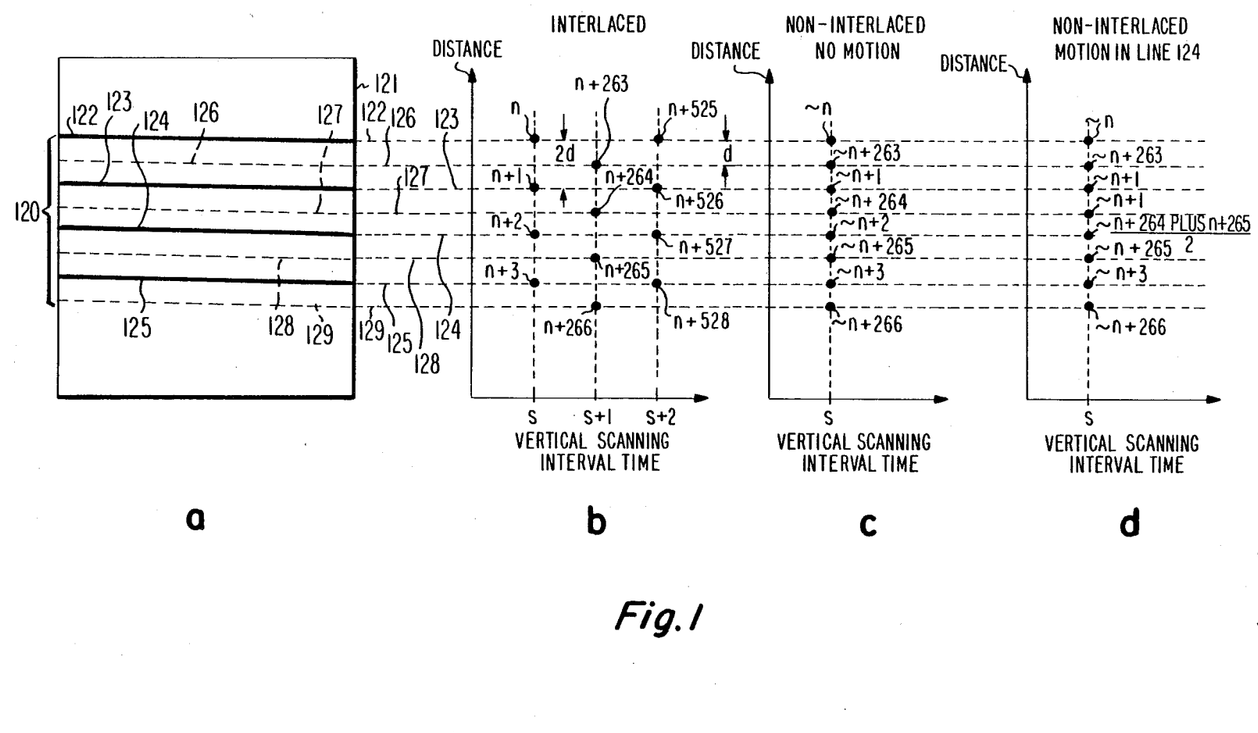
Figure 4:
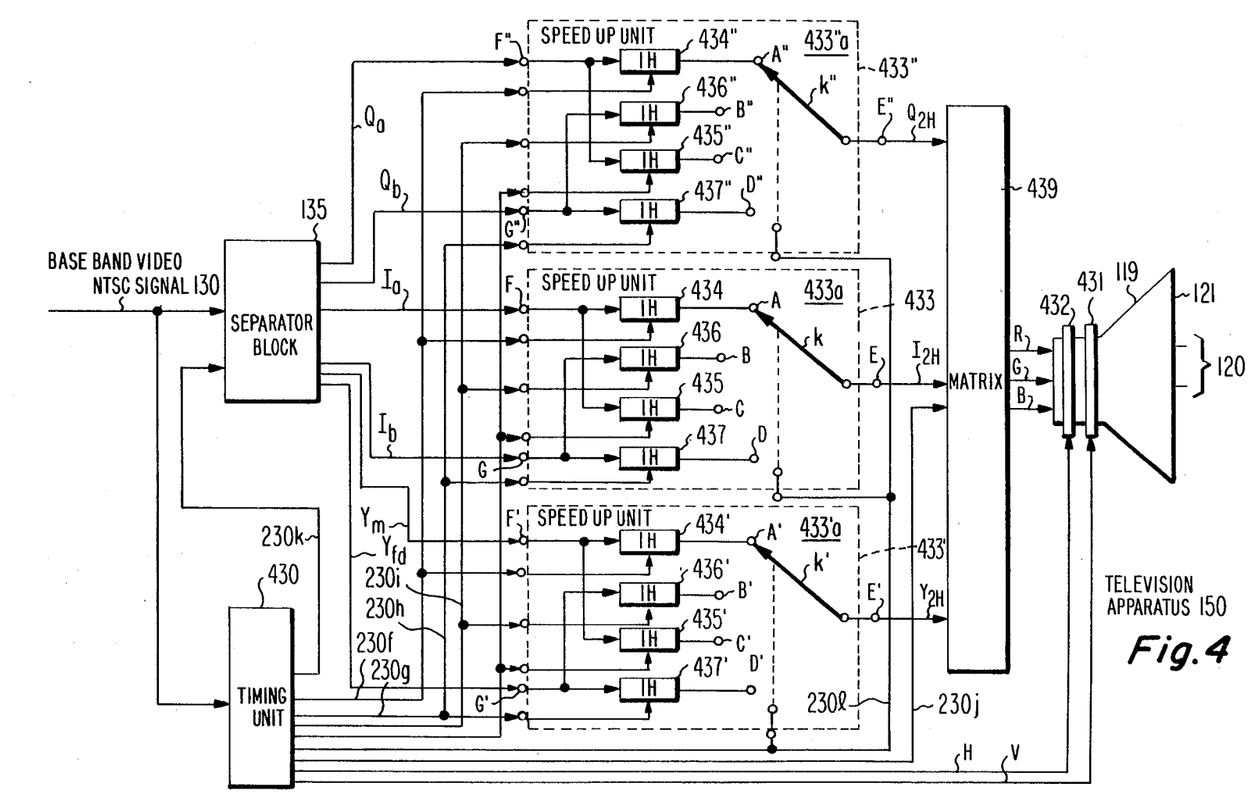
FIG. 4 illustrates the block diagram of a television apparatus of the invention that includes the separator block of FIG. 3 for displaying the picture information of the television signal of FIG. 2, in non-interlaced scanning format.

FIG. 1a illustrates a faceplate 121 of a cathode ray tube such as illustrated in FIG. 4, as described later on, that includes in a given portion 120 four horizontal display lines, 122–125, illustrated in solid lines, and four interleaving horizontal display lines, 126–129, illustrated in broken lines. FIG. 1a is used below in explaining the standard interlaced as well as the non-interlaced scanning format of the invention.

Figure 2:
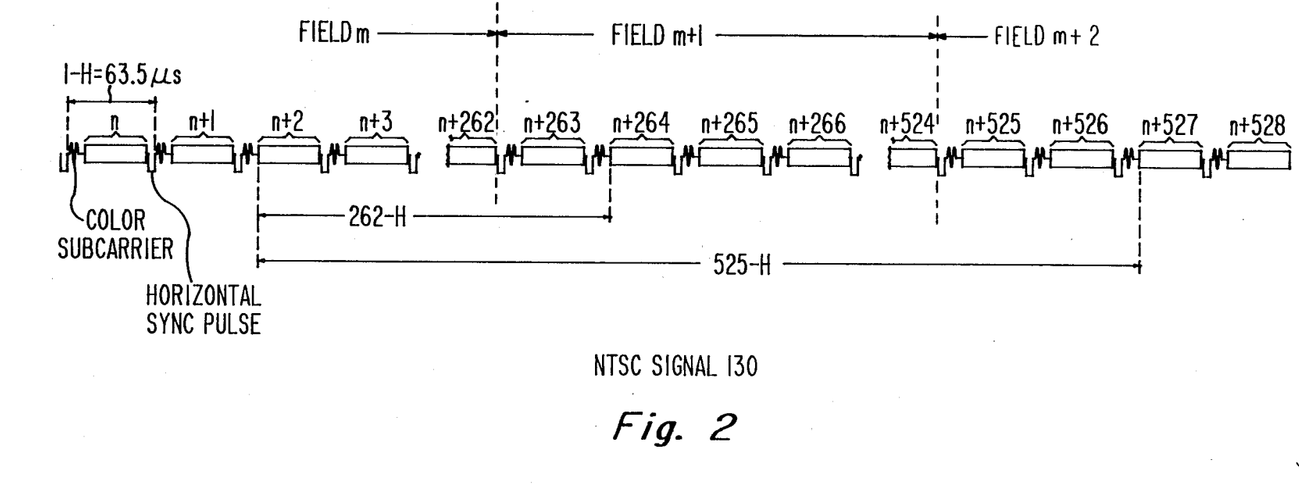
FIG. 2 illustrates schematically video lines in three consecutive fields of the television signal.

FIG. 2 illustrates schematically a composite interlaced color NTSC signal 130. In an interlaced scanning format, video line n, n+1, n+2 and n+3 of the field m of signal 130 provide picture information for display in lines 122, 123, 124 and 125, respectively, of FIG. 1a. FIG. 1b illustrates schematically the vertical spacing between lines 122–125, respectively, and the associated video line n through n+3 of field m of FIG. 2 having their picture information displayed in a vertical scanning interval s. Likewise, FIG. 2 illustrates schematically video lines n+263, n+264, n+265 and n+266, of the immediately following field, m+1, of signal 130 that provide picture information for display in lines 126, 127, 128 and 129, respectively, of FIG. 1a having their picture information displayed in a vertical scanning interval s+1. Similarly, FIG. 1b illustrates schematically the vertical spacing between lines 126–129, respectively and the four associated video lines n+263 through n+266 of field m+1 of FIG. 2 for the standard interlaced format. In the same manner, video lines n+525, n+526, n+527 and n+528 of a field m+2 of FIG. 2, supply picture information for display in a vertical scanning interval s+2 in the interlaced scanning format in scan lines 122–125, as illustrated in FIG. 1b.

In 2:1 interlaced scanning format the picture information of only one field is displayed during one vertical scanning interval. Two adjacent display lines that display picture information from field m, such as display lines 122 and 123, are spaced vertically by a distance 2d, as illustrated in FIG. 1b. Whereas, adjacent display lines in which the picture information from fields m and m+1, respectively, is displayed, for example lines 122 and 126, are displaced vertically by a distance d which is ½ the length of distance 2d, as illustrated in FIG. 1b.

FIG. 4 illustrates a television apparatus 150, embodying aspects of the invention, that displays the picture information of an interlaced television signal in a non-interlaced format, as described later on. Apparatus 150 includes a cathode ray tube 119 having a faceplate 121 such as illustrated in FIG. 1a.

Figure 3:
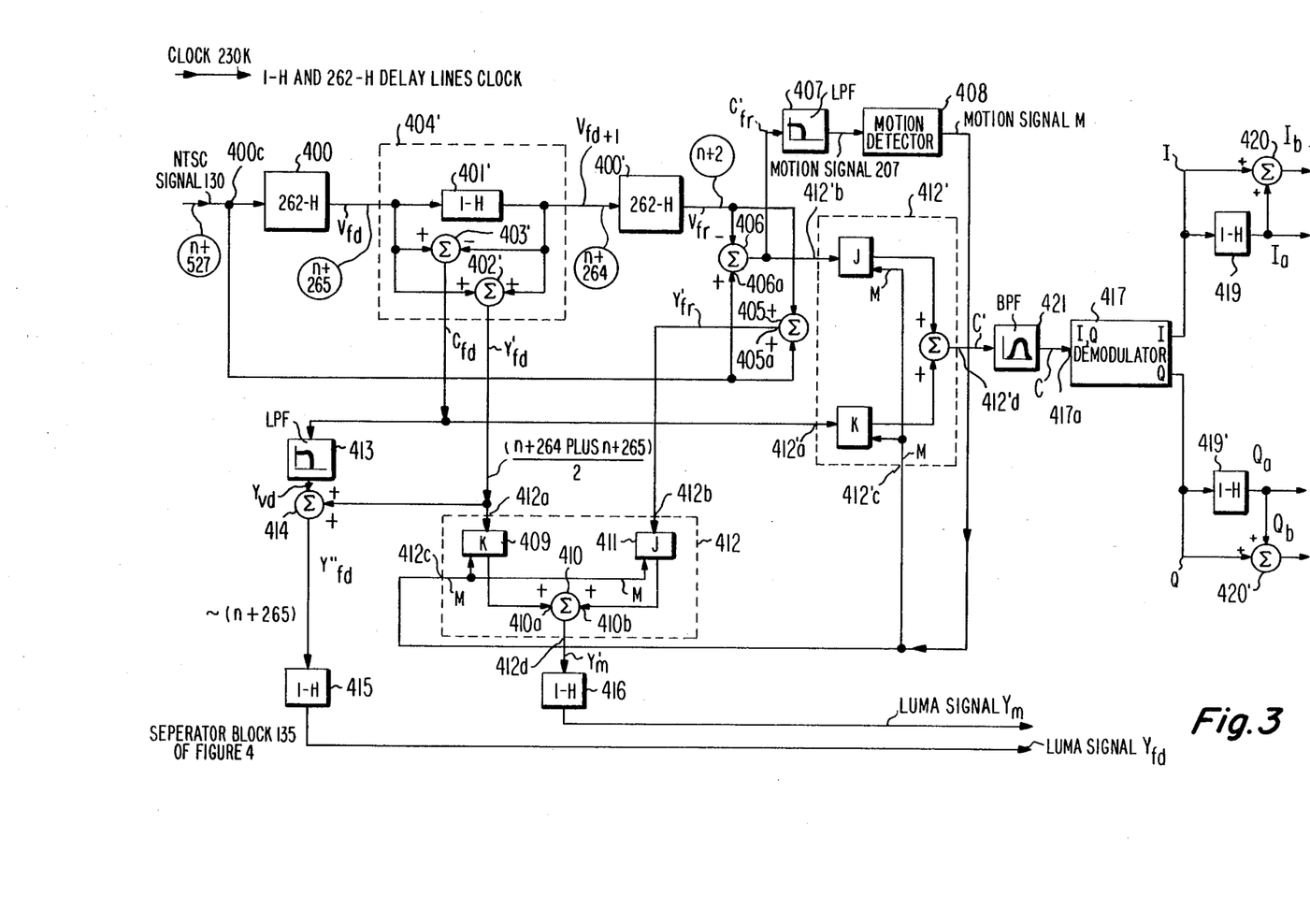
FIG. 3 illustrates the block diagram of the separator block of FIG. 4.

FIG. 3 illustrates a separator block 135 of apparatus 150 of FIG. 4 embodying aspects of the invention, for generating the signals that provide picture information for display in the display lines of faceplate 121 of FIG. 4 in a non-interlaced format. Indentical numbers and symbols in FIGS. 1b, 2, 3, and 4 indicate similar items or functions. Referring to FIG. 3, an analog, composite NTSC signal 130 of FIG. 2 is applied to a terminal 400c of separator block 135 from a source which is not shown. The source of signal 130 may be the demodulated output of an IF stage of a standard television receiver. It should be noted that the invention will be described with reference to NTSC composite signal but other interlaced composite signals are within the scope of the invention. The invention may be implemented using digital or analog techniques, or both.

NTSC signal 130 is delayed by a 262-H delay unit 400, where 262-H delay is equal to 262 times the scan line time of 63.5 microseconds, which is approximately a field delay time, as illustrated in FIG. 2, to form a signal $V_{fd}$ of FIG. 3. Unit 400 is a clocked first-in first-out buffer. Clock 230k supplies the clock signal to unit 400, s described later on. Signal $V_{fd}$ is applied to a separator 404' of FIG. 3 which is, illustratively, a two-terminal transversal filter having a 1-H delay unit 401', also known as a comb filter. The 1-H delay is equal to the scan line time of 63.5 microseconds, as illustrated in FIG. 2. Signal $V_{fd}$ of FIG. 3 is delayed by 1-H delay unit 401' to produce a signal $V_{fd+1}$. 1-H delay unit 401' is a clocked first-in first-out (FIFO) buffer. A clock 230k supplies the clock signal to unit 401', as described later on. In separator 404' of FIG. 3, signal $V_{fd+1}$ and signal $V_{fd}$ are combined and the result multiplied by a scale factor of ½, in an adder/scaler 402', to form a signal $Y'_{fd}$ which is combed. Signal $Y_{fd}$ includes the luminance-representative component of NTSC signal 130 of FIG. 2 having a frequency spectrum with signal energy in the vicinity of integer multiples of the 15734 Hz line rate and nulls of signal energy in the vicinity of odd integer multiples of one half of the line rate. As as result of the combined process, the chrominance-representative component that originated in NTSC signal 130 is substantially reduced in signal $Y_{fd}$ of FIG. 3.

Delayed and undelayed signals are applied to a subtractor/scaler 403' of separator 404' that subtracts signal $V_{fd+1}$ from signal $V_{fd}$ and multiplies the result by a scale factor of ½ to form a combed signal $C'_{fd}$. Signal $C'_{fd}$ represents a portion of the luminance information and the chrominance information having a frequency spectrum with signal energy concentrated in the vicinity of odd integer multiples of one half the line rate and nulls of signal energy in the vicinity of integer multiples of the line rate. As a result of the combing process, the luminance-representative component that originated in NTSC signal 130 of FIG. 2 is substantially reduced in signals $C'_{fd}$ of FIG. 3. To restore vertical detail into luminance signal $Y'_{fd}$ lost through the combining process, signal $C'_{fd}$ is applied through a low pass filter 413 having a cutoff frequency of illustrative 1 MHz for generating a signal $Y_{vd}$ that contains luminance vertical detail information. Signal $Y_{vd}$ is applied to one input terminal of an adder/scaler 414, whereas signal $Y'_{fd}$ is coupled to its other terminal. Adder/scaler 414 adds the signals at its respective terminals and the result is multiplied by a scale factor of ½ to produce a luminance signal $Y''_{fd}$ containing restored vertical detail. Signal Y″$_{fd}$ is applied through a 1-H delay 415 to produce a luma signal Y$_{fd}$, that is discussed later on. 1H delay 415 is illustratively similar to 1-H delay 401′ and receives the same clock signal 230k at the respective terminal.

Signal Y$_{fd+1}$ is delayed by a 262-H delay unit 400′ of, approximately by a field time, to form a signal V$_{fr}$. Unit 400′ is a clocked first-in first-out buffer, illustratively, identical to unit 400. Clock 230k supplies the clock signal to unit 400′, as described later on. Signal V$_{fr}$ is equal to NTSC signal 130 delayed by one image, or frame, time delay that is equal to 525 display line periods.

Signal V$_{fr}$ and NTSC signal 130 are summed together in an adder/scaler 405. The luminance components of the signals being in phase add and the result is multiplied by a scale factor of ½; the chrominance components being 180 degrees out of phase, and therefore cancel each other. The result is applied to a terminal 405a to substantially produce chrominance-free luminance signal Y′$_{fr}$ when successive frame signals are records of the same stationary scene.

Signal V$_{fr}$ is subtracted from NTSC signal 130 in a subtractor/scaler 406 in which the chrominance components of the two frames sum constructively and the result is multiplied by the scale factor ½, while the luminance components cancel each other. The result is applied at a terminal 406a to substantially produce a luminance-free chrominance signal C′$_{fr}$ when successive frame signals are records of the same stationary scene. Signal C′$_{fr}$ is applied through a low pass filter 407 to substantially produce a chrominance-free motion signal 207. Motion signal 207 contains the low frequency luminance cross components occurring in the chrominance signal during interframe image motion. Thus, in the absence of motion, low pass filter 407 produces no motion descriptive signal.

Motion signal 207 is coupled to a motion detector 408. Motion detector 408 outputs a motion signal M having, illustratively, an amplitude that is directly related to the absolute value of motion signal 207, illustratively, by means of a full wave rectifier. Motion detector 408 may also include a threshhold detector that causes motion signal M to indicate that motion occurred only when the absolute value of motion signal 207 exceeds a predetermined threshold voltage. Luminance signal Y′$_{fr}$ at a terminal 412b of combining unit 412 is applied through a gain controlled device 411 of unit 412, having a gain factor J, to a terminal 410b of an adder 410 of unit 412. Likewise, luminance signal Y′$_{fd}$ at a terminal 412a is coupled through a gain controlled device 409 of unit 412, having a gain factor K, to a terminal 410a of adder 410 of unit 412. Adder 410 adds the signals at terminals 410a and b, respectively, to produce a weighted sum luminance signal Y′$_m$ at a terminal 412d of combining unit 412. Thus, signal Y′$_m$ of unit 412 may be expressed as a function of the signals at terminals 412a and b, respectively, of unit 412 as follows:

Signal Y′$_m$=K×signal Y′$_{fd}$+J×signal Y′$_{fr}$.

Signal Y′$_m$ is applied through a 1-H delay 416 to produce a luma signal Y$_m$ that is discussed layter on. 1-H delay 416 is illustratively similar to 1-H delay 410′ and receives the same clock signal 230k at the respective terminal. Motion signal M at a terminal 412c is coupled to gain controlled devices 409 and 411, respectively, for controlling their respective gain factors, as discussed below.

As a first hypothetical example, assume the following facts. In gain controlled device 409, the gain factor K equals 1 when the absolute value of motion signal 207 exceeds a first threshold level, corresponding to a detected interframe motion; conversely, K=0 when motion signal 207 does not exceed the first threshold level, corresponding to stationary picture or the absence of detected motion. Assume also that in gain controlled device 411, the gain factor J equals 0 when the absolute value of motion signal 207 exceeds the first threshold level; conversely, J=1 when motion signal 207 does not exceed the first threshold level. Thus, when motion is detected, signal Y′$_m$=signal Y′$_{fd}$; conversely, when motion is not detected, signal Y′$_m$=signal Y′$_{fr}$.

Figure 5:
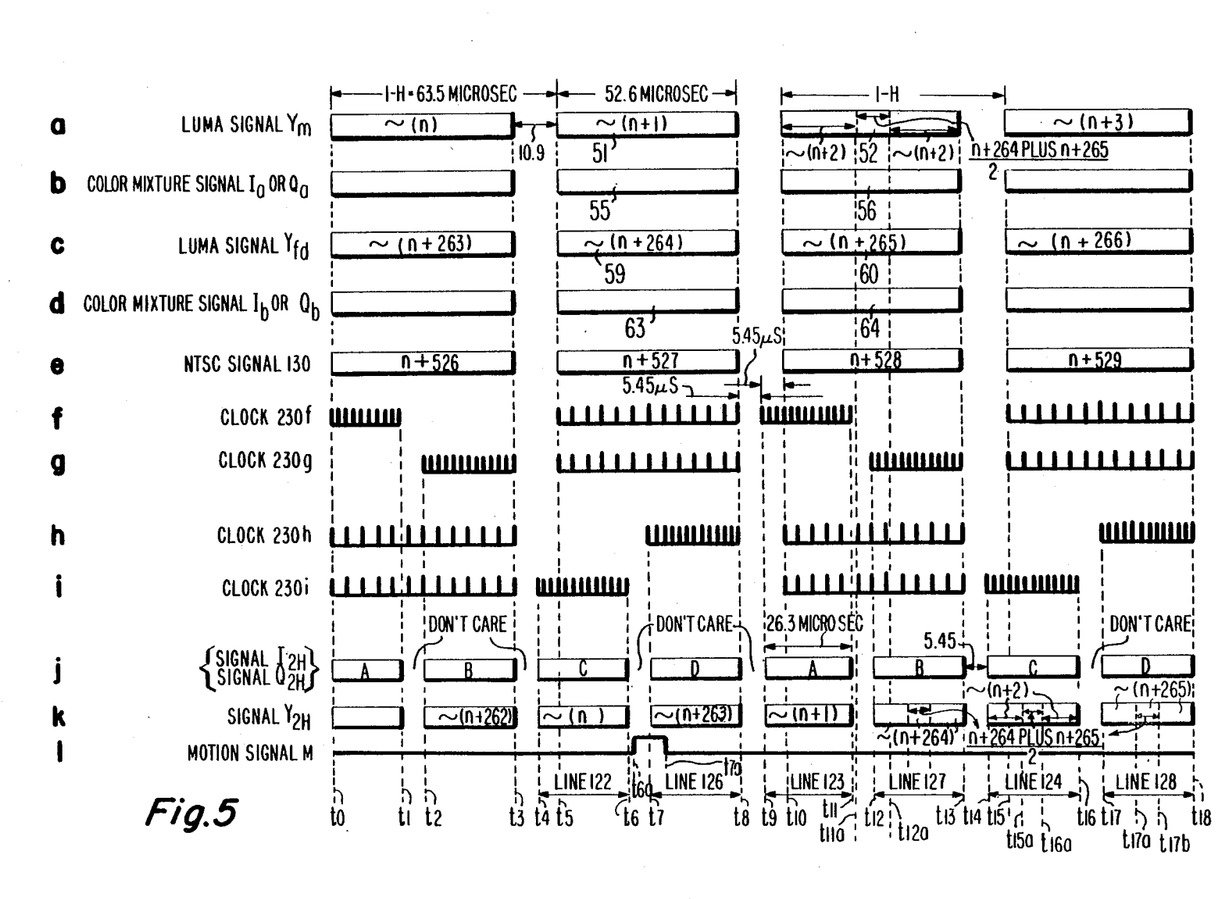

FIG. 5e illustrates schematically successive video lines of interlaced NTSC signal 130 of FIG. 2. In FIG. 5e, video line n+527 is illustrated as occurring between time t5 and time t8. Identical numbers in FIGS. 5e and 2 indicate identical items or functions.

Assume that video line n+527 is present at terminal 400c of block 135 of FIG. 3 as illustrated symbolically in the respective circle in FIG. 3 that contains the symbol n+527. It follows from this assumption that signals V$_{fd}$, V$_{fd+1}$ and V$_{fr}$ of FIG. 3 contain the video information of video lines n+265, n+264 and n+2 of FIG. 2, respectively, when video line n+527 is present in NTSC signal 130, as illustrated symbolically inside the respective circles in FIG. 3. Thus, luminance signal Y′$_{fd}$ of FIG. 3 represents the averaged luminance signal contained in consecutive video lines n+264 and n+265, respectively in field m+1 of NTSC signal 130 of FIG. 2. Simultaneously, chrominance signal C′$_{fd}$ of FIG.3 represents the averaged chrominance signal derived from consecutive video lines n+264 and n+265, respectively of field m+1.

FIG. 5c illustrates schematically luma signal Y$_{fd}$ that is equal to the restored luminance signal Y$_{fd}$ at the output of 1-H delay 415. One luma line 60 of luma signal Y$_{fd}$ is schematically illustrated as occurring between time t10 and time t13. When video line n+527 of FIG. 5c is at terminal 400c of FIG. 3, signal Y$_{fd}$ may be calculated, assuming the facts of the first hypothetical example of follows:

$$\text{signal } Y'_{fd} = \frac{\text{video line } n + 264 \text{ plus video line } n + 265}{2} +$$

$$\frac{\text{video line } n + 265 \text{ minus video line } n + 264}{2} =$$

the luminance portion of video line $n + 265$.

Luma line 60 of luma signal Y$_{fd}$ contains the delayed luminance signal Y″$_{fd}$ as illustrated in FIG. 5c; therefore, it is equal the luminance portion of video line n+265 of FIG. 2. It should be understood that the evaluation of luma line 60 is valid for the frequency range up to the cutoff frequency of low pass filter 413 of FIG. 3, and that luma line 60 of FIG. 5c contains mainly the luminance component of signal part n+265 of FIG. 5e. Luma line 60 of luma signal Y$_{fd}$ of FIG. 5c is identified in FIGS. 5c, 5k, 1b and 1c as ~(n+265).

FIG. 5a illustrates schematically luma signal Y$_m$ that is the 1-H delayed luma signal Y′$_m$ at the output of combining unit 412. One luma line 52 of luma signal Y$_m$ is schematically illustrated between time t10 and time t13. As explained before, signal Y′$_m$ of FIG. 3 equals signal Y′$_{fd}$ when motion is detected, and equals signal Y′$_{fr}$ when it is not detected. Thus, for the same facts assumed in the first hypothetical example, and when video line n+527 of FIG. 5e is at terminal 400c of FIG. 3, signal Y'$_m$ may be calculated as follows: when no motion is detected, $$\text{signal } Y'_m = \frac{\text{video line } n + 2 \text{ plus video line } n + 527}{2}$$

Because the luminance component of video line n+2 equals that of video line n+527, when no motion is detected, the following equation holds:

$$\text{signal } Y'_m = \text{the luminance portion of video line } n + 2.$$

When motion is detected, $$\text{signal } Y'_m = \frac{\text{video line } n + 264 \text{ plus video line } n + 265}{2}$$

Luma line 52, illustrated in FIG. 5a, has the same value as signal Y'$_m$ but is delayed by 1-H. When no motion is detected, luma line 52 of luma signal Y$_m$ of FIG. 5a is identified in FIGS. 5a, 5k and 1c as n~(n+2), because it does not contain identical luminance information of video line n+2 but only an approximation of it.

FIG. 5l illustrates an example of motion signal M of FIG. 3. In FIG. 5l motion is detected from time t6a to time t7a. Motion signal M of FIG. 5l causes, in the first example, that the luminance component of the average value of video lines n+264 and n+265 of FIG. 2, from time t11a to time t12a is included in luma line 52 of FIG. 5a.

As explained later on, luma line 52 of luma signal Y$_m$ provides the luminance picture information for display in line 124 of FIG. 1a. Similarly, luma line 60 of luma signal Y$_{fd}$ provides the luminance picture information for display in line 128 of FIG. 1a that is immediately below line 124.

As explained before, whether or not motion occurs, luma line 60 of luma signal Y$_{fd}$ of FIG. 5c, that is associated with line 128 of FIG. 1a, contains the luminance picture information of video line n+265 of field m+1 of NTSC signal 130 of FIG. 2. As can be deduced from FIG. 1b, the same luminance picture information is displayed in line 128 in the standard interlaced scanning format.

When no motion is detected, luma line 52 of luma signal Y$_m$ of FIG. 5a, that is associated with line 124 of FIG. 1a, contains the same luminance information as in video line n+2 or in video line n+527 of field m of NTSC signal 130 of FIG. 2. As can be observed from FIG. 1b, the same luminance information is displayed in line 124 in the standard interlaced scanning format.

As explained before, FIG. 5l illustrates an example of motion signal M of FIG. 3 that occurs between time 6a and time 7a. As a result of motion signal M of FIG. 5l, luma line 52 of luma signal Y$_m$ of FIG. 5a contains substantially the luminance picture information of the average value of video lines 265 and 264 of FIG. 5e. Thus, so long as motion is detected, the picture information that is displayed in adjacent display lines is derived from the same field m+1. Therefore, the artifacts that would have caused discontinuities in the edges of moving objects, as explained before, are eliminated, in accordance with the the motion compensation aspect of the invention.

The motion compensation scheme may be activated by motion detector 408 of FIG. 3 on a pixel basis as illustrated in FIGS. 5a and 5l, thus compensating for motion in a given section of a display line; alternatively, it may be activated on a line or a frame basis.

As explained before, each of signals C'$_{fr}$ and C'$_{fd}$ of FIG. 3 contains chrominance component of NTSC signal 130 of FIG. 2. In the absence of motion, signal C'$_{fr}$, being the output signal of the frame comb filter, has lower cross luminance components than signal C'$_{fd}$ which is obtained from the line comb filter. However, signal C'$_{fr}$ becomes distorted as a result of frame-to-frame motion.

Therefore, it is desirable to display the chrominance information of signal C'$_{fr}$ when the scene is stationary. Conversely, when the scene is not stationary, it is desirable to display the chrominance information of signal C'$_{fd}$.

Signals C'$_{fd}$ and C'$_{fr}$ are coupled to terminals 412'a and 412'b, respectively, of a unit 412' that operates, illustratively, similarly to unit 412. Terminals 412'a, b, c and d of unit 412' correspond to terminals 412a, b, c and d, respectively, of unit 412. Motion signal M is coupled to terminal 412'c. A chrominance or color signal C' at output terminal 412'd is coupled through a band pass filter 421, that passes signals within the band of frequencies around the color subcarrier frequency that contains chrominance information. The chrominance signal C at the output of bandpass filter 421 is coupled to an input terminal 417a of an I, Q demodulator 417.

Thus, assuming the facts of the first hypothetical, when motion is detected signal C' is equal to signal C'$_{fd}$ that is not contaminated by motion related distortions. Conversely, when no motion is detected, it is equal to signal C'$_{fr}$ in which the luminance cross component is reduced relative to that in signal C'$_{fd}$.

Demodulator 417, of conventional design, generates a color signal I and a color signal Q that contain the demodulated I and Q components, respectively, of signal C'. Signal I is coupled through a 1-H delay 419 to form a signal I$_a$. 1-H delay 419 operates similarly to 1-H delay 401' and receives the same clock signal 230k at the respective terminal. Signal I$_a$ and undelayed signal I are coupled to two respective terminals of an adder/scaler 420 that sums the respective signals and multiplies the result by a scale factor of ½ to produce a signal I$_b$. Note that signal I$_b$ is obtained by averaging technique. Thus, signal I$_b$ contains the interpolated I information of a preceding and a following video lines.

FIGS. 5b and d illustrate schematically signals I$_a$ and I$_b$, respectively.

Signal Q is coupled to a 1H delay 419' and to an adder/scaler 420' to form signals Q$_a$ and Q$_b$. Thus, signals Q$_a$ and Q$_b$ are formed from signal Q similarly to the way signals I$_a$ and I$_b$, respectively, are formed from signal I.

In the first hypothetical example, it was assumed that the gain factor K of device 409 of unit 412 is equal to 1 and the gain factor J of device 411 of unit 412 is equal to 0 when motion is detected; conversely, when no motion is detected, it was assumed that the gain factor K of device 409 is equal to 0 and the gain factor J of device 411 is equal to 1.

As a trade off between motion compensation, vertical picture resolution and to avoid switching artifacts that may occur, the respective gain factor may exhibit a smoother or soft characteristic as a function of the absolute value of motion signal 207 of FIG. 3. Thus, motion signal M may cause devices 409 and 411 of unit 412 to proportionate signals $Y'_{fd}$ and $Y'_{fr}$ respectivey, for forming signal $Y'_m$. Similarly, it may cause unit 412' to proportionate signals $C_{fd}$ and $C'_{fr}$ respectively, for forming signal C'. Alternatively, some or all of the gain factors K and J of units 412 and 412' may be set to a certain value independently of motion signal M.

Television apparatus 150 of FIG. 4 includes separator block 135 of FIG. 3. NTSC signal 130 of FIG. 2 is also coupled in apparatus 150 to a timing unit 430. Timing unit 430 utilizes horizontal and vertical sync pulses of NTSC signal 130 for generating a horizontal scanning current H and a vertical scanning current V for driving a horizontal deflection winding 432 and a vertical deflection winding 431, respectively. The scanning frequency of horizontal scanning current H is twice that of a standard television receiver using the interlaced scanning format; whereas, the frequency of vertical scanning current V is of the same. Timing unit 430 may include a phase-locked-loop circuit, not shown, that generates clock signals that are phase locked to the color burst signal of NTSC signal 130 of FIG. 2 for generating clock signals $230j$-$k$ and for generating a timing signal $230l$, all of FIG. 4. Clock signal $230k$ of illustratively $4 \times Sc$, where Sc is the 3.58 MHz frequency of the color subcarrier of NTSC signal 130 of FIG. 2 is coupled to separator block 135 for clocking the clocked delay lines, as explained before.

Referring to FIG. 4, signal $I_a$ of block 135 of FIG. 3 is applied through a terminal F to 1-H delays 434 and 435, respectively. Signal $I_b$ of block 135 of FIG. 3 is applied through a terminal G to 1-H delay units 436 and 437 of FIG. 4, respectively. The 1-H delay units 434-437 may comprise first-in first-out (FIFO) buffers.

FIGS. 5f-5i illustrate schematically clocks $230f$, $230g$, $230h$ and $230i$ of FIG. 4, respectively, that are coupled to 1-H delay units 434, 436, 435 and 437, respectively. Clock $230f$ of FIG. 5f clocks samples of a chroma line 55 of signal $I_a$ of FIG. 5b between time t5 an time t8, for example, into 1-H delay unit 434 of FIG. 4 at a first clock rate as illustrated by the short vertical lines in FIG. 5f. Simultaneously, clock $230g$ of FIG. 5g clocks samples of a chroma line 63 of signal $I_b$ of FIG. 5d into 1-H delay unit 436 of FIG. 4 at the same first clock rate. The samples in unit 434 of FIG. 4 are clocked out at a second clock rate which is double the rate of the first clock, as illustrated by the short vertical lines of clock $230f$ in FIG. 5f, between times t9 and t11. The samples in unit 436 of FIG. 4 are clocked out at the second clock rate, as illustrated by the short vertical lines of clock $230g$ of FIG. 5g between time t12 and t13. The samples from unit 434 and 436, respectively, of FIG. 4 are coupled to terminals A and B of a switch 433a, respectively. FIG. 5j illustrates schematically a signal $I_{2H}$ that is coupled by a wiper k of switch 433a to a terminal E. Wiper k is controlled by timing signal $230l$. Wiper k couples the samples of unit 434 at terminal A to terminal E for forming the respective portion of signal $I_{2H}$ between times t9 and t11 as illustrated in FIG. 5j; likewise, wiper k of FIG. 4 couples the samples of unit 436 at terminal B to terminal E between times t12 and t13.

In a like manner, clock $230i$ of FIG. 5i clocks samples of a chroma line 56 of FIG. 5b between time t10 and time t13 into 1-H delay unit 435 of FIG. 4 at the first clock rate as illustrated by the short vertical lines in FIG. 5i. Simultaneously, clock $230h$ of FIG. 5g clocks samples of a chroma line 64 of FIG. 5d into 1-H delay unit 437 of FIG. 4 at the same first clock rate. The samples in unit 435 of FIG. 4 are clocked out at the second clock rate which is double the rate of the first clock, as illustrated by the short vertical lines of clock $230i$ in FIG. 5i between times t14 and t16. The samples in unit 437 of FIG. 4 are clocked out at the second clock rate, as illustrated by the short vertical lines of clock $230h$ of FIG. 5h, respectively, between time t17 and t18. The samples from unit 435 and 437 of FIG. 4 are coupled to terminals C and D of switch 433a, respectively. Wiper k couples the samples of unit 435 at terminal C to terminal E between times t14 and t16 of FIG. 5j for generating the respective portion of signal $I_{2H}$; likewise, wiper k of FIG. 4 couples the samples of unit 437 at terminal D to terminal E between times t17 and t18. Thus, signal $I_{2H}$ of FIG. 5j contains the speeded up signals $I_a$ and $I_b$ of FIGS. 5b and d, respectively, in alternate time slots. For the example of FIG. 5j, each time slot is equal to one-half the 53.6 microseconds active scan line time of NTSC signal 130 of FIG. 2.

A speed unit 433" in FIG. 4, that is, illustratively, constructed similarly to speedup unit 433 has terminals E", F" and G" that correspond to terminals E, F and G respectively, of speedup unit 433. Unit 433" of FIG. 4 receives clocks $230f$-$i$ and signal $230l$ as does unit 433 and it operates similarly. Signal $Q_a$ of block 135 of FIG. 3 is applied to terminal F" of speedup unit 433" of FIG. 4 and signal $Q_b$ is applied to terminal G" of speed up unit 433". A signal $Q_{2H}$ at terminal E" of unit 433" is coupled to matrix 439. Thus, signal $Q_{2H}$ contains the speeded up signals $Q_a$ and $Q_b$ respectively in alternate time slots. FIG. 5j may also illustrate schematically signal $Q_{2H}$ of FIG. 4.

A speedup unit 433' in FIG. 4, that is illustratively constructed similarly to speedup unit 433 has terminals E', F' and G' that correspond to terminals E, F and G respectively, of speedup unit 433. Unit 433' of FIG. 4 receives clocks $230f$-$i$ and signal $230l$ as does unit 433 and it operates similarly. Luma signal $Y_m$ of block 135 of FIG. 3 is applied to terminal F' of speedup unit 433' of FIG. 4 and luma signal $Y_{fd}$ is applied to terminal G' of speedup unit 433'. A signal $Y_{2H}$ at terminal E' of unit 433' contains the speeded up luminance information of both luma signal $Y_m$ of FIG. 5a and luma signal $Y_{fd}$ of FIG. 5c, respectively, in alternate time slots. FIG. 5k illustrates schematically signal $Y_{2H}$ of FIG. 4 for the first example. Note that the luminance picture information of luma line 52 is speeded up to be contained in signal $Y_{2H}$ between time t14 and time t16. Signal $Y_{2H}$ of FIG. 5k, between times t15a and time t16a contains a speeded up portion of luma signal $Y_m$. The signal contents of this portion is selected by motion signal M of FIG. 5l. Signals $I_{2H}$, $Q_{2H}$ and $Y_{2H}$ are coupled to the respective terminals of an I, Q, Y matrix 439, of conventional construction, but of expanded bandwidth. I, Q, Y matrix 439 generates signals R, G and B from signals $I_{2H}$, $Q_{2H}$ and $Y_{2H}$ for driving the respective guns of cathode ray tube 119. FIG. 5j may also illustrate schematically signals R, G and B, respectively.

FIG. 1c illustrates diagrammatically, as an approximation, the respective video lines of NTSC signal 130 of FIG. 2 that supply luminance picture information for display during a vertical scanning interval s in each of scan lines 122-129 of FIG. 1a for an example in which no motion is detected. The picture information is displayed in non-interlaced format during one vertical scanning interval. Note that the same respective video line of NTSC signal 130 of FIG. 2 provides luminance information for display in the same line as in the interlace scanning format of FIG. 1b. For example, between time t14 and time t16 of FIG. 5j, signals R, G and B of FIG. 4 provide the luminance information of video line n+1 for display in line 123.

FIG. 1d illustrates diagrammatically, as an approximation, the respective video lines of NTSC signal 130 of FIG. 2 that supply luminance information for display during the vertical scanning interval s in each of scan lines 122-129 of FIG. 1a. FIG. 1d illustrates the situation in which motion compensation is performed in scan line 124. In the case where no motion is detected, as illustrated in FIG. 1c, the same luminance information of video line n+2 of NTSC signal 130 of FIG. 2 supplies the luminance picture information for display in scan line 124. When motion is detected between time t6a and time t7a of FIG. 5l, a portion of signal $Y_{2H}$ of FIG. 5k between time t15a and t16a supplies the average value of video lines n+264 and n+265 of FIG. 2 that are contained in the previous coupled field m+1 of NTSC signal 130 of FIG. 2, as illustrated in figure line 124 of FIG. 1d. Thus, assuming the facts of the first hypothetical example. The luminance information for displaying a moving object is derived, in each vertical scanning interval, from the immediately preceding field only. Moreover, the substituted picture information, in the presence of motion, is derived from signals that provide picture information for display in the immediately preceding and following scan lines. As illustrated in FIGS. 5k and 1d, the luminance information that is displayed in line 124 is derived from the luminance information that is displayed in line 127 and 128 and that originated in video lines n+264 and n+265 of field m+1 of NTSC signal 130 of FIG. 2.

What is claimed is:

1. A television apparatus for generating from an incoming composite color television signal first and second luminance output signals that are capable of providing picture information for display in a first plurality and in a different second plurality of display lines, respectively, of a non-interlaced television display, to form a picture frame, comprising:
   a source of said incoming composite color television signal;
   a delay element coupled to said source for delaying said incoming television signal by substantially one field period and by one frame period, respectively, to produce field and frame delayed television signals, respectively;
   first means for adding said incoming television signal and said frame delayed television signal to produce a first frame comb filtered luminance video signal containing a luminance component derived from said incoming and frame delayed television signals;
   second means for adding adjacent lines of said field delayed television signal for producing a second luminance video signal containing a luminance component derived from said field delayed television signal;
   third means for combining said first and second luminance video signals to produce said first luminance output signal; and
   fourth means responsive to said second luminance video signal for generating said second luminance output signal therefrom.

2. The television apparatus as recited in claim 1 further comprising, means for extracting a picture detail signal from said field delayed television signal, wherein said fourth means is responsive to said picture detail signal for producing said second luminance output signal that contains restored picture details and wherein said third means combines said first and second luminance video signal to produce said first luminance output signal without restoring said picture details to said first luminance output signal.

3. The television apparatus as recited in claim 1 wherein said delay element includes first and second intermediate output taps spaced apart by a delay of one video line time, and wherein said second means comprises means for additively combining the signals at said first and second output taps to form said second luminance video signal.

4. The television apparatus as recited in claim 1 further comprising, means for combining said incoming television signal and said frame delayed television signal to produce the difference thereof, means for producing from said difference signal a motion indicative signal, and wherein said third means proportionally combines said first and second luminance video signals in accordance with said motion indicative signal.

5. The television apparatus as recited in claim 4 further comprising, demodulator means responsive to said difference signal for producing therefrom first and second color output signals that are capable of providing color information for display in said first and second pluralities of display lines of said non-interlaced television display.

6. The television apparatus as recited in claim 5 wherein said first and second color output signals producing means further comprises, combining means responsive to said field delayed chrominance signal and means for combining said field delayed chrominance and difference signals for application to said demodulator means.

7. The television apparatus as recited in claim 6 wherein said last mentioned combining means is responsive to said motion indicative signal for controlling respective proportions of said field delayed chrominance and difference signals applied to said demodulator means.

8. The television apparatus as recited in claim 4 wherein said motion indicative signal assumes a first level only when said television signal manifests a nonstationary picture scene.

9. The television apparatus as recited in claim 4 wherein said motion indicative signal producing means comprises a low pass filter for producing a signal from said difference signal such that a chrominance component signal of said television signal is attenuated, and means for producing said motion indicative signal from said signal that is produced by said low pass filter such that the amplitude of said motion indicative signal is directly related to the amplitude of said signal that is produced by said low pass filter.

10. The television apparatus as recited in claim 4 wherein, in said third means, the contribution of said signal that is produced by said second means for producing said first luminance output signal is directly proportional to the amplitude of said motion indicative signal.

* * * * *